(12) United States Patent
Ichimoto (10) Patent No.: US 9,008,883 B2
(45) Date of Patent: Apr. 14, 2015

(54) CONTROL DEVICE AND CONTROL METHOD FOR HYBRID VEHICLE

(75) Inventor: Kazuhiro Ichimoto, Miyoshi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/234,487

(22) PCT Filed: Jul. 27, 2011

(86) PCT No.: PCT/JP2011/067147
§ 371 (c)(1),
(2), (4) Date: Jan. 23, 2014

(87) PCT Pub. No.: WO2013/014772
PCT Pub. Date: Jan. 31, 2013

(65) Prior Publication Data
US 2014/0156132 A1     Jun. 5, 2014

(51) Int. Cl.
*B60W 20/00* (2006.01)
*B60W 10/06* (2006.01)
*B60W 10/08* (2006.01)
*B60W 10/26* (2006.01)
*B60W 50/00* (2006.01)

(52) U.S. Cl.
CPC ............... *B60W 20/10* (2013.01); *B60W 10/06* (2013.01); *B60W 20/00* (2013.01); *B60W 10/08* (2013.01); B60W 2050/0089 (2013.01); B60W 2510/244 (2013.01); B60W 20/1082 (2013.01); B60W 20/40 (2013.01); Y02T 10/6286 (2013.01); *B60W 10/26* (2013.01); Y10S 903/93 (2013.01)

(58) Field of Classification Search
USPC ............... 701/22, 36; 477/2, 3, 7; 180/65.21, 180/65.245, 65.25, 65.22, 65.265, 65.28, 180/65.285
See application file for complete search history.

(56) References Cited

U.S. PATENT DOCUMENTS

2003/0217876 A1* 11/2003 Severinsky et al. .......... 180/65.2
2014/0191513 A1* 7/2014 Kees et al. .................... 290/38 R
2014/0203674 A1* 7/2014 Cao et al. ........................ 310/54

FOREIGN PATENT DOCUMENTS

| JP | 2000-324613 A | 11/2000 |
|---|---|---|
| JP | 2004-186087 A | 7/2004 |
| JP | 2004-201411 A | 7/2004 |
| JP | 2007-218107 A | 8/2007 |
| JP | 2008-094238 A | 4/2008 |
| JP | 2009-18743 A | 1/2009 |

* cited by examiner

*Primary Examiner* — Richard Camby
(74) *Attorney, Agent, or Firm* — Sughrue Mion, PLLC (57) ABSTRACT

A hybrid vehicle has a first running mode with an engine stopped and a second running mode with the engine operating. An ECU monitors information related to the frequency of intermittent startup of the engine in response to the startup and stoppage of the engine during vehicle running. The ECU executes running control such that startup of the engine is suppressed during the first running mode when in an operation pattern in which the frequency of intermittent startup is high. Accordingly, discomfort to the driver and degradation in fuel efficiency caused by repeating stoppage and startup of the engine frequently in a short period of time can be prevented.

8 Claims, 6 Drawing Sheets

CONTROL DEVICE AND CONTROL METHOD FOR HYBRID VEHICLE

CROSS REFERENCE TO RELATED APPLICATIONS

This is a National Stage of International Application No. PCT/JP2011/067147 filed Jul. 27, 2011, the contents of all of which is incorporated herein by reference in its entirety.

TECHNICAL FIELD

The present invention relates to a control device and a control method for a hybrid vehicle, more particularly, to the running control of a hybrid vehicle that runs with intermittent operation of the engine.

BACKGROUND ART

A hybrid vehicle having an engine and an electric motor mounted as the source of vehicle driving power may be configured to allow selection of a running mode with the engine stopped, and a running mode with the engine operated. When such a hybrid vehicle attains a running state where the engine is required during running with the engine in an inactive state, the engine will be started automatically. When the hybrid vehicle then attains a running state where the engine is no longer required, the operating engine is automatically stopped. Thus, the engine is operated automatically in an intermittent manner.

Japanese Patent Laying-Open No. 2009-18743 (PTD 1) discloses control of a hybrid vehicle capable of generating the electric power for charging a battery from the engine output, directed to reducing the frequency of starting and stopping an engine for battery charging when the vehicle is at a halt for a long period of time.

Japanese Patent Laying-Open No. 2007-218107 (PTD 2) discloses control of determining whether to permit execution of idling stop based on the SOC (State of Charge) and SOH (State of Health) of the battery to store electric power used in engine startup. Particularly, the threshold values of the SOC and SOH used for the determination of allowing/disallowing idling stop are modified based on the execution count of idling stop within a predetermined period of time after starting battery usage (claim 2 in PTD 2). Accordingly, execution of idling stop is suppressed.

Japanese Patent Laying-Open No. 2004-186087 (PTD 3) discloses a power supply system including a power storage device having the SOC regulated within a predetermined range, wherein the SOC of the power storage device is increased when the number of times the SOC attains the lower limit or approaches the lower limit of the SOC regulation range.

CITATION LIST

Patent Document

PTD 1: Japanese Patent Laying-Open No. 2009-18743
PTD 2: Japanese Patent Laying-Open No. 2007-218107
PTD 3: Japanese Patent Laying-Open No. 2004-186087

SUMMARY OF INVENTION

Technical Problem

The hybrid vehicle of PTD 1 aims to improve the fuel efficiency by continuing running at idling stop and having the engine to operate intermittently even during vehicle running. However, if engine intermittent startup occurs frequently, there is a possibility of bringing discomfort to the driver and/or adversely affecting the fuel efficiency. In other words, it is preferable from the standpoint of commercial performance for the hybrid vehicle to control the intermittent operation of the engine to improve the fuel efficiency upon preventing the frequency of intermittent startup from being excessive.

With regard to this issue, PTD 1 mentions suppressing the engine intermittent startup when the vehicle is at a halt for a long period of time. However, the frequency of engine intermittent startup during vehicle running is not particularly taken into account. PTD 2 is directed to suppressing execution of idling stop, and does not take into account the frequency of engine intermittent startup during vehicle running. PTD 3 controls the refresh-charging of a storage battery, and does not take into account the frequency of engine intermittent startup.

In view of the foregoing, an object of the present invention is to execute running control that suppresses excessive increase of the engine startup/stopping frequency in a hybrid vehicle that runs with engine intermittent operation.

Solution to Problem

An aspect of the present invention is directed to a control device of a hybrid vehicle having an engine and a traction motor mounted. The control device includes a running control unit and an engine control unit. The running control unit is configured to select a first running mode with the engine stopped and a second running mode with the engine operating, based on a state of the vehicle. The engine control unit is configured to start the engine in association with modification from the first running mode to the second running mode, and stop the engine in association with modification from the second running mode to the first running mode. The running control unit controls the running of the hybrid vehicle such that modification from the first running mode to the second running mode is suppressed when the frequency of intermittent startup is high as compared to the case where the frequency of intermittent startup is low, based on information related to the frequency of intermittent startup of the engine during vehicle running.

Preferably, the running control unit specifies modification to the second running mode when the required power of the hybrid vehicle becomes higher than a threshold value in the first running mode. The threshold value is set at a higher value when the frequency of intermittent startup is high than when the frequency of intermittent startup is low.

Alternatively and preferably, the hybrid vehicle is further mounted with a power storage device to store electric power input to and output from the traction motor, and a power generation mechanism to generate charging electric power for the power storage device by an output from the engine. The running control unit starts the engine to charge the power storage device when the SOC of the power storage device becomes lower than a predetermined value in the first running mode, and controls charging and discharging of the power storage device such that the SOC approaches a control target in the second running mode. The control target is set higher when the frequency of intermittent startup is high than when the frequency of the intermittent startup is low.

Further preferably, the information is generated, based on a count of stopping the engine within a predetermined period of time during vehicle running, such that a higher count indicates a higher frequency of intermittent startup.

Alternatively and preferably, the information is generated, based on an inactive duration when the engine is stopped during vehicle running, such that a shorter inactive duration indicates a higher frequency of intermittent startup.

Another aspect of the present invention is directed to a control method of a hybrid vehicle. The hybrid vehicle has an engine and a traction motor mounted, and is configured to select a first running mode with the engine stopped and a second running mode with the engine operating based on a state of the vehicle. The control method includes the steps of monitoring information related to frequency of intermittent startup of the engine according to stoppage and operation of the engine during vehicle running, and controlling the running of the hybrid vehicle such that modification from the first running mode to the second running mode is suppressed when the frequency of intermittent startup is high as compared to the case where the frequency of intermittent startup is low, based on the information.

Preferably, the controlling step includes the steps of specifying modification to the second running mode when the required power of the hybrid vehicle becomes higher than a threshold value in the first running mode, and setting the threshold value at a higher value when the frequency of intermittent startup is high than when the frequency of intermittent startup is low, based on the information.

Alternatively and preferably, the hybrid vehicle is further mounted with a power storage device to store electric power input to and output from the traction motor, and a power generation mechanism to generate charging electric power for the power storage device by an output from the engine. The controlling step includes the steps of starting the engine to charge the power storage device when the SOC of the power storage device becomes lower than a predetermined value in the first running mode, controlling charging and discharging of the power storage device such that the SOC approaches a control target in the second running mode, and setting the control target at a higher value when the frequency of intermittent startup is high than when the frequency of intermittent startup is low.

Further preferably, the monitoring step generates information, based on a count of stopping the engine within a predetermined period during vehicle running, such that a higher count indicates higher frequency of intermittent startup.

Alternatively and preferably, the monitoring step generates information, based on an inactive duration when the engine is stopped during vehicle running, such that a shorter inactive duration indicates the higher frequency of intermittent startup.

Advantageous Effects of Invention

According to the present invention, excessive increase in the frequency of starting and stopping the engine can be suppressed in a hybrid vehicle running with intermittent operation of the engine.

DESCRIPTION OF EMBODIMENTS

Embodiments of the present invention will be described in detail hereinafter with reference to the drawings. In the drawings, the same or corresponding elements have the same reference characters allotted, and description thereof basically will not be repeated.

First Embodiment

Figure 1:
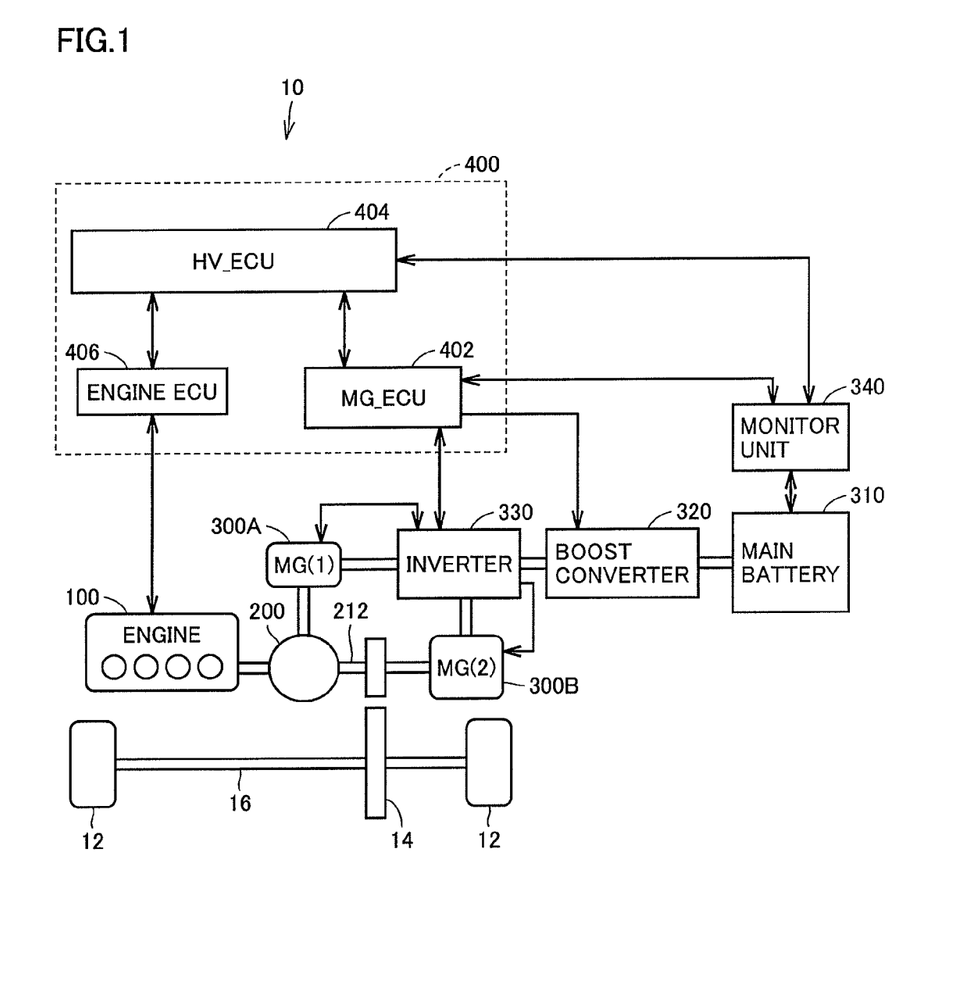
FIG. 1 is a block diagram to describe an exemplified configuration of a hybrid vehicle mounted with a control device according to an embodiment of the present invention.

FIG. 1 is a block diagram to describe an exemplified configuration of a hybrid vehicle 10 having a control device according to an embodiment of the present invention mounted.

Referring to FIG. 1, hybrid vehicle 10 includes a driving wheel 12, a reduction gear 14, a drive shaft 16, an engine 100, a power split mechanism 200, motor generators 300A (MG (1)) and 300B (MG (2)), and a main battery 310 storing the driving electric power of motor generators 300A and 300B.

Each of motor generators 300A and 300B is typically constituted of a permanent magnet type 3-phase AC synchronous motor, operable as an electric motor and a power generator by torque control.

Power split mechanism 200 is coupled with an output shaft of engine 100, an output shaft of motor generator 300A, and an output shaft 212. Output shaft 212 is coupled with the output shaft of motor generator 300B. Further, reduction gear 14 is provided between drive shaft 16 that drives driving wheel 12 and output shaft 212. Accordingly, through a predetermined speed reducing ratio, the rotational force of output shaft 212 by engine 100 and motor generators 300A, 300B can be transmitted to driving wheel 12, and inversely, the rotational force of driving wheel 12 can be transmitted to motor generator 300B via output shaft 212.

The output from engine 100 is divided by power split mechanism 200 to output shaft 212 and motor generator 300A. Motor generator 300A can operate as a power generator using the power from engine 100 by being controlled so as to output negative torque. The electric power generated by motor generator 300A can be used to charge main battery 310 and/or to drive motor generator 300B. In other words, motor generator 300A corresponds to "power generation mechanism".

Motor generator 300A can function as a starter of engine 100 by operating as an electric motor at the startup of engine 100.

Further, motor generator 300B can operate as a power generator at the time of regenerative braking to generate the charging electric power for main battery 310. At this stage, the kinetic energy of the vehicle is converted into electrical energy, causing generation of regenerative braking power, whereby hybrid vehicle 10 is reduced in speed.

Furthermore, since the output shafts of engine 100, motor generator 300A and motor generator 300B are coupled via power split mechanism 200, the ratio of the revolution speed of engine 100 to the revolution speed of output shaft 212 (transmission gear ratio) can be controlled in a stepless manner by the revolution speed control of motor generator 300A during running.

Hybrid vehicle 10 runs with the power of at least one of engine 100 and motor generator 300B. Therefore, hybrid vehicle 10 can have engine 100 stopped and run with only the output from motor generator 300B that operates as a motor. In other words, motor generator 300B corresponds to "traction motor". When running in a low speed state or low load state, a running mode with engine 100 inactive (hereinafter, also referred to as "first running mode") is generally selected.

When the power required for hybrid vehicle 10 to run becomes higher, a running mode with engine 100 operated (hereinafter, also referred to as "second running mode") is selected. In the second running mode, the output from engine 100 is set according to the sum of the power for the vehicle to run and the power for generating the charging electric power for main battery 310. In other words, in the second running mode, the vehicle may run with the output of engine 100 alone, or run by the sum of the outputs from engine 100 and motor generator 300A.

When the SOC of main battery 310 is reduced, engine 100 is started to force the charging of main battery 310 even in a state where running with the output of motor generator 300B alone is allowed. In this case, the second running mode is selected.

Thus, a first running mode with engine 100 stopped and a second running mode with engine 100 operated is selectively applied according to the vehicle state at hybrid vehicle 10. When modification from the first running mode to the second running mode is specified, engine 100 is started in association with motoring by motor generator 300A. When modification from the second running mode to the first running mode is specified, engine 100 is stopped. At this stage, motor generator 300A may output speed reducing torque to stop engine 100 promptly.

Hybrid vehicle 10 further includes a monitor unit 340 of main battery 310, a boost converter 320, an inverter 330, a MG (Motor Generator)_ECU (Electronic Control Unit) 402, an HV (Hybrid Vehicle)_ECU 404, and an engine ECU 406.

Main battery 310 is indicated as a typical example of "power storage device", typically constituted of a secondary battery such as of nickel-metal hydride or lithium ion. Alternatively, an electrical double layer capacitor may be employed as "power storage device" instead of a secondary battery. Monitor unit 340 monitors a state of main battery 310 (across-terminal voltage (battery voltage) Vb, battery current Ib, battery temperature Tb, and the like).

Inverter 330 executes bidirectional power conversion between AC power that is input to and output from motor generators 300A, 300B, and DC power that is input to and output from main battery 310. Inverter 330 is represented as one block globally representing a plurality of inverters provided individually corresponding to each of motor generators 300A and 300B.

Boost converter 320 executes bidirectional DC voltage conversion between the DC link voltage of inverter 330 (corresponding to the AC voltage amplitude of motor generators 300A, 300B) and the output voltage from main battery 310. As a result, motor driving control can be rendered highly efficient since the rated voltage of motor generators 300A, 300B can be set higher than the rated voltage of main battery 310.

MG_ECU 402 controls motor generator 300, inverter 330, and the charging/discharging state of main battery 310 according to the state of hybrid vehicle 10. Engine ECU 406 controls the operating state of engine 100. HV_ECU 404 monitors and controls engine ECU 406 and MG_ECU 402 relatively so as to control the overall hybrid system such that hybrid vehicle 10 is operated most efficiently.

Each ECU is formed of an electronic control unit incorporating a CPU (Central Processing Unit) and memory not shown, and is configured to perform computing using detection values from each sensor based on a map and program stored in a relevant memory. Alternatively, at least a portion of ECU may be configured to execute a predetermined arithmetic/logical operation by hardware such as an electronic circuit.

Although FIG. 1 shows each ECU implemented as a separate configuration, two or more ECUs may be integrated as an ECU. For example, an exemplified configuration is to integrate MG_ECU 402, HV_ECU 404 and engine ECU 406 as an ECU 400, as indicated by the dotted line. In the following description, they are generically indicated as ECU 400 without discrimination between MG_ECU 402, HV_ECU 404 and engine ECU 406.

To ECU 400 are input values of the state of main battery 310 (across-terminal voltage Vb, battery current Ib, battery temperature Tb, and the like), or a signal notifying occurrence of an error, from a vehicle speed sensor, an accelerator position sensor, a throttle opening position sensor, a revolution speed sensor and current sensor of motor generators 300A, 300B, an engine revolution sensor (all not shown), and from monitor unit 340.

Main battery 310 can be configured to allow charging from a power supply external to the vehicle. In this case, a charger (not shown) to control the charging of main battery 310 by electric power from an external power supply must be provided. The feeding from an external power supply is allowed applying contact charging using a charging cable, or non-contact charging via a coil.

Figure 2:
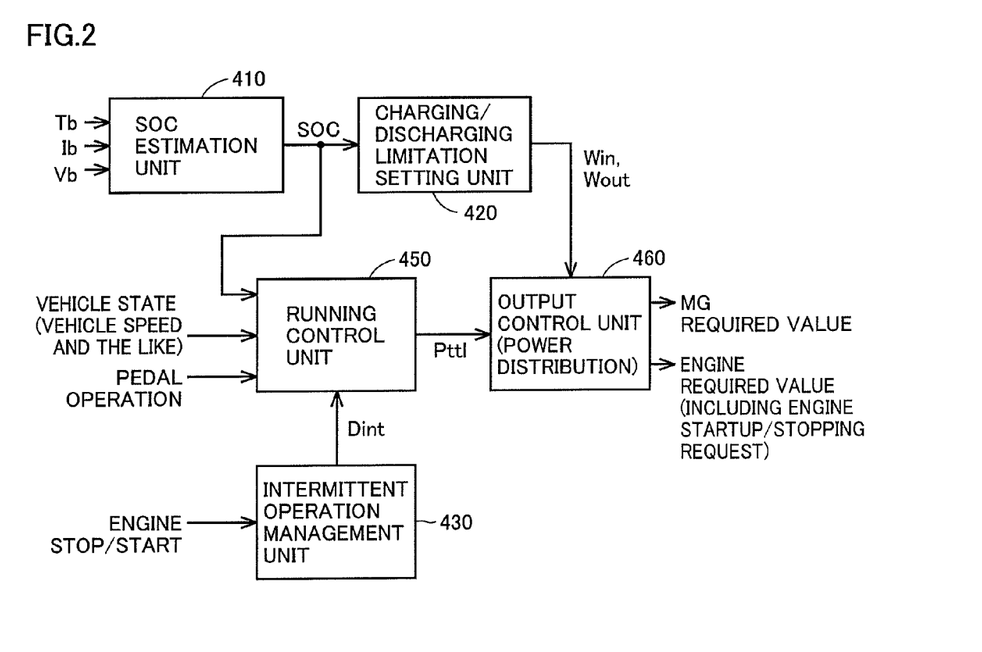
FIG. 2 is a block diagram to describe running control of the hybrid vehicle shown in FIG. 1.

FIG. 2 is a block diagram to describe running control of hybrid vehicle 10. It is assumed that the function of each block in the block diagram such as FIG. 2 is implemented by software processing and/or hardware processing by ECU 400.

Referring to FIG. 2, ECU 400 includes an SOC estimation unit 410, a charging/discharging limitation setting unit 420, an intermittent operation management unit 430, a running control unit 450, and an output control unit 460.

SOC estimation unit 410 generates SOC indicating the remaining amount in main battery 310 based on at least some of battery temperature Tb, battery current Ib and battery voltage Vb of main battery 310. SOC is the current remaining amount with respect to a fully charged state in percentage.

Charging/discharging limitation setting unit 420 sets charging/discharging electric power upper limits Win and Wout according to mainly the current SOC and battery temperature Tb. As will be described afterwards, the running of hybrid vehicle 10 is controlled such that the charging/discharging of main battery 310 is within the range of Win-Wout.

Intermittent operation management unit 430 responds to stopping and startup of engine 100 to generate intermittent startup data Dint to monitor the degree of intermittent startup of engine 100 during vehicle running. Intermittent startup data Dint is a quantitative value set larger as the frequency of intermittent startup of engine 100 becomes higher. In other words, a larger value of intermittent startup data Dint implies an operation pattern where discomfort to the driver and degradation in fuel efficiency are apprehended.

Intermittent startup data Dint is indicated by, for example, the count of stoppage of engine 100 during vehicle running within a predetermined period of time. At least the stopping or startup of engine 100 during a running operation (vehicle speed>0) is reflected in intermittent startup data Dint. Alternatively, intermittent startup data Dint may be generated further reflecting the stoppage of engine 100 in a halted state (i.e. idling stop).

Alternatively, intermittent startup data Dint may be generated based on the inactive duration in a stopped state of engine 100 (that is, the period of time from stopping to restarting). Since the discomfort to the driver and degradation in fuel efficiency will be increased by repeating engine stoppage frequently in a short period of time, the computation is preferably executed such that intermittent startup data Dint is larger as the inactive duration becomes shorter. Moreover, intermittent startup data Dint can be generated based on both the count of stopping during a predetermined time and the inactive duration.

Running control unit 450 calculates the vehicle driving power required for the entire hybrid vehicle 10 (total required power Pttl) based on the state of hybrid vehicle 10, specifically the vehicle state based on the pedal operation on the accelerator, the brakes and the like by the driver as well as the vehicle speed.

Further, running control unit 450 selects either the first running mode (engine inactive) and the second running mode (engine operated) based on the state of hybrid vehicle 10. Running control unit 450 sends a flag MD indicating the selected running mode result to output control unit 460. As will be described in detail afterwards, intermittent startup data Dint from intermittent operation management unit 430 is reflected in the running control of the hybrid vehicle according to the present embodiment. Schematically, running control unit 450 controls the running of hybrid vehicle 10 such that modification from the first running mode to the second running mode is suppressed when intermittent startup data Dint is large.

In the first running mode, output control unit 460 generates MG required values to motor generators 300A, 300B and the output required value to engine 100 such that engine 100 is stopped and total required power Pttl is ensured by the output from motor generator 300B. In the second running mode, output control unit 460 generates MG required values to motor generators 300A, 300B and the output required value to engine 100 such that total required power Pttl is ensured under the limitation of the charging and discharging of main battery 310 being executed within the charging/discharging allowed range (Win-Wout) of main battery 310.

When modification from the first running mode to the second running mode is specified by the aforementioned flag MD, output control unit 460 generates the output required values to motor generators 300A, 300B and engine 100 such that engine 100 is started. In contrast, when modification from the second running mode to the first running mode is specified by flag MD, output control unit 460 generates the output required values to motor generators 300A, 300B and engine 100 such that engine 100 is stopped. In other words, output control unit 460 has the function of "engine control unit" for engine 100 to be started and stopped according to the modification of the running mode.

Engine 100 is controlled to operate according to the aforementioned output required values by ECU 400 (engine ECU 406) as set forth above. Further, ECU 400 (MG_ECU 402) controls boost converter 320 and inverter 330 such that motor generators 300A and 300B operate according to the MG required value (typically, torque command value).

The running control of the hybrid vehicle according to the first embodiment will be described hereinafter with reference to FIGS. 3-6.

Figure 3:
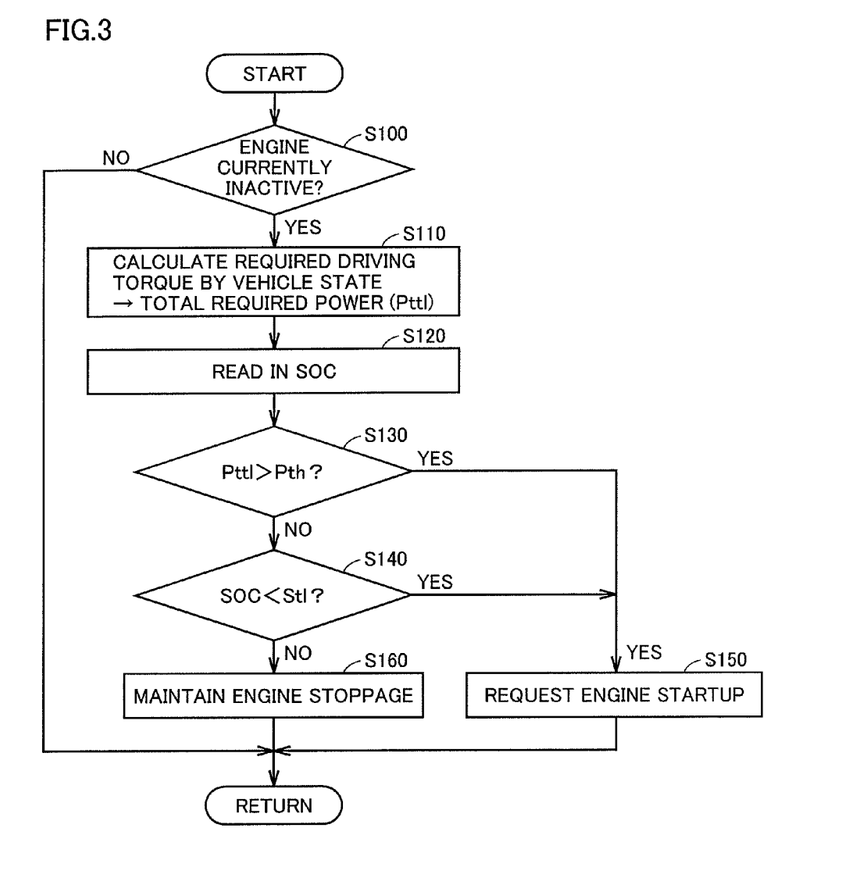
FIG. 3 is a flowchart to describe a control process in a first running mode by running control of the hybrid vehicle according to a first embodiment.

FIG. 3 is a flowchart to describe the control process in the first running mode by the running control of the hybrid vehicle according to the first embodiment. It is assumed that the process of each step in each of the flowcharts such as in FIG. 3 is implemented by software processing and/or hardware processing through ECU 400.

Referring to FIG. 3, ECU 400 determines whether the engine is currently stopped at step S100. When the engine is currently operating (NO determination at S100), the process of steps S110-S160 that will be described hereinafter is not executed. The control process in the second running mode will be described in detail in the second embodiment.

When the engine is currently stopped, i.e. when in the first running mode (YES determination at S100), the process of steps S110-S160 set forth below is executed. The process of steps S110-S160 corresponds to the function of running control unit 450 in FIG. 2.

ECU 400 calculates required driving torque (Tr*) from the state of the vehicle, and calculates total required power Pttl of the hybrid vehicle based on the required driving torque.

For example, a map (not shown) having the relationship of the accelerator opening position and vehicle speed with the required driving torque Tr* determined in advance is stored in ECU 400. ECU 400 can calculate required driving torque Tr* by referring to the map based on the current accelerator pedal position and vehicle speed.

ECU 400 also calculates total required power Pttl to cause required driving torque Tr* to be generated at output shaft 212. For example, total required power Pttl is calculated according to the product of required driving torque Tr* and the revolution speed of output shaft 212.

ECU 400 reads in the SOC of main battery 310 estimated by SOC estimation unit 410 at step S120.

At step S130, ECU 400 compares total required power Pttl calculated at step S110 with a power threshold value Pth. Power threshold value Pth is a threshold value indicating whether operation of engine 100 is required or not to ensure total required power Pttl under the current state of the vehicle.

Figure 4:
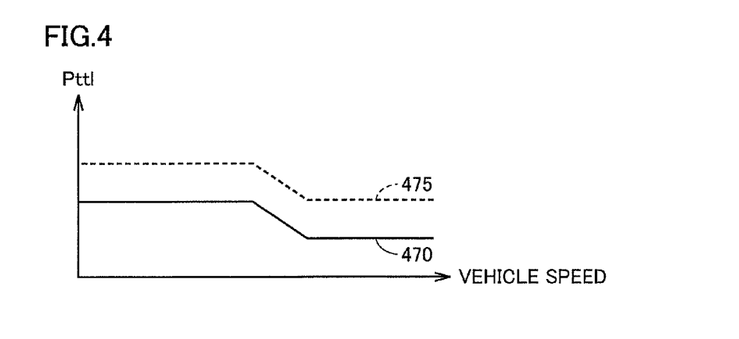
FIG. 4 is a schematic diagram to describe an exemplified setting of a power threshold value to determine whether engine operation is required or not according to the first embodiment.

FIG. 4 represents an example of setting power threshold value Pth.

Referring to FIG. 4, power threshold value Pth is set according to the vehicle speed, as indicated by a characteristic line 470 in solid line. Schematically, power threshold value Pth is set lower when at a high vehicle speed than at the low vehicle speed. Further, power threshold value Pth must be set taking into account the discharging electric power upper limit Wout of main battery 310. In other words, when Wout becomes low by reduction in SOC of main battery 310, power threshold value Pth is set lower. Engine 100 is more readily started as power threshold value Pth becomes lower.

Referring to FIG. 3 again, ECU 400 causes control to proceed to step S150 when Pttl>Pth (YES determination at S130). When Pttl≤Pth (NO determination at S130), ECU 400 compares the SOC of main battery 310 with a determination value Stl at step S140.

Determination value Stl is a threshold value to determine whether forced charging of main battery 310 is required or not to restrict the SOC to be within a predetermined range. When SOC<Stl (YES determination at S140), ECU 400 causes control to proceed to step S150. When SOC≥Stl (NO determination at S140), control proceeds to step S160.

At step S150, ECU 400 requests startup of engine 100 to ensure total required power Pttl or to generate the charging electric power for main battery 310. In other words, modification from the first running mode to the second running mode is specified. In response, output control unit 460 (FIG. 2) generates the output required values of motor generator 300B and engine 100 such that engine 100 is started.

At step S160, ECU 400 maintains engine 100 at an inactive state since charging of main battery 310 is not required and total required power Pttl can be ensured with engine 100 stopped. In other words, the first running mode is maintained. Then, output control unit 460 generates the MG required values for motor generators 300A and 300B such that total required power Pttl is ensured with engine 100 stopped.

According to the running control of the hybrid vehicle in the first embodiment, power threshold value Pth is altered according to the operation pattern of the intermittent operation of engine 100 during vehicle running (that is, intermittent startup data Dint).

Figure 5:
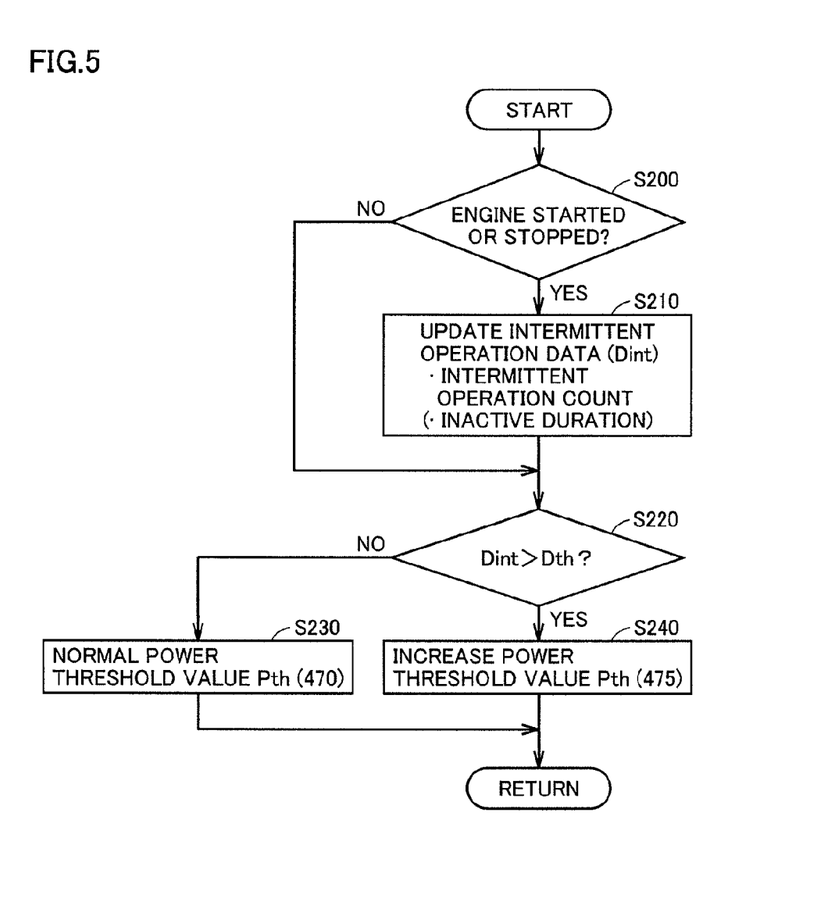
FIG. 5 is a flowchart to describe the setting of a power threshold value based on an operation pattern by the running control of the hybrid vehicle according to the first embodiment.

FIG. 5 is a flowchart to describe the setting of the power threshold value based on the operation pattern by the hybrid vehicle running control of the first embodiment. In FIG. 5, the process at steps S200 and S210 corresponds to the function of intermittent operation management unit 430 of FIG. 2, whereas the process at steps S220-S240 corresponds to the function of running control unit 450 of FIG. 2.

When engine 100 is started or stopped (YES determination at S200) in FIG. 5, ECU 400 updates intermittent startup data Dint at step S210. Intermittent startup data Dint is calculated based on the stopping count and/or inactive duration of engine 100 during vehicle running within a predetermined period of time. During a control period where startup or stopping of engine 100 is not detected (NO determination at S200), the current intermittent startup data Dint is maintained.

Figure 6:
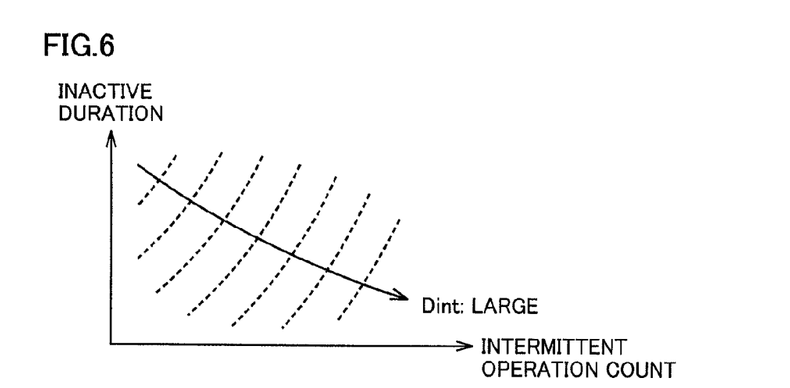
FIG. 6 schematically represents the relationship between an engine stopped status and intermittent startup data.

As shown in FIG. 6, for example, intermittent startup data Dint is set larger as the count of intermittent startup (or engine stopping) within a predetermined period of time becomes higher. As to the inactive duration in an engine stopped state, intermittent startup data Dint is set at a larger value as the inactive duration is shorter. The stopping/startup of engine 100 (intermittent startup) occurs more frequently as intermittent startup data Dint is larger, implying an operation pattern in which the discomfort of the driver and degradation in fuel efficiency is expected.

Referring to FIG. 5 again, ECU 400 compares intermittent startup data Dint with threshold value Dth at step S220.

When Dint≤Dth (NO determination at S220), ECU 400 causes control to proceed to step S230 to set power threshold value Pth at a normal value. In other words, power threshold value Pth is set according to the vehicle speed corresponding to solid line 270 in FIG. 4. In contrast, when Dint>Dth (YES determination at S220), ECU 400 causes control to proceed to step S240 to set power threshold value Pth larger than the normal value. For example, power threshold value Pth is set based on the vehicle speed according to characteristic line 475 indicated by a dotted line in FIG. 4.

As appreciated from FIG. 4, power threshold value Pth is set higher than the normal value when intermittent startup data Dint is large, i.e. when in a operation pattern where the stopping/startup of engine 100 (intermittent startup) occurs frequently. Accordingly, startup of engine 100 in the first running mode is suppressed. As a result, vehicle running is controlled such that the count of the intermittent startup of engine 100 is suppressed.

Thus, in the case of an operation pattern where the frequency of intermittent startup of engine 100 is high in the hybrid vehicle running control of the first embodiment in the present invention, running control is executed such that engine startup during the first running mode is suppressed. Therefore, the discomfort to the driver and degradation in the fuel efficiency caused by frequently repeating engine stopping/startup in a short period of time can be prevented.

Second Embodiment

When the SOC of main battery 310 is reduced, engine 100 is started to force charging even in the first running mode (engine inactive), as described in the first embodiment. The second embodiment is directed to vehicle control to suppress the frequency of engine intermittent startup by reducing the event of such forced charging.

Figure 7:
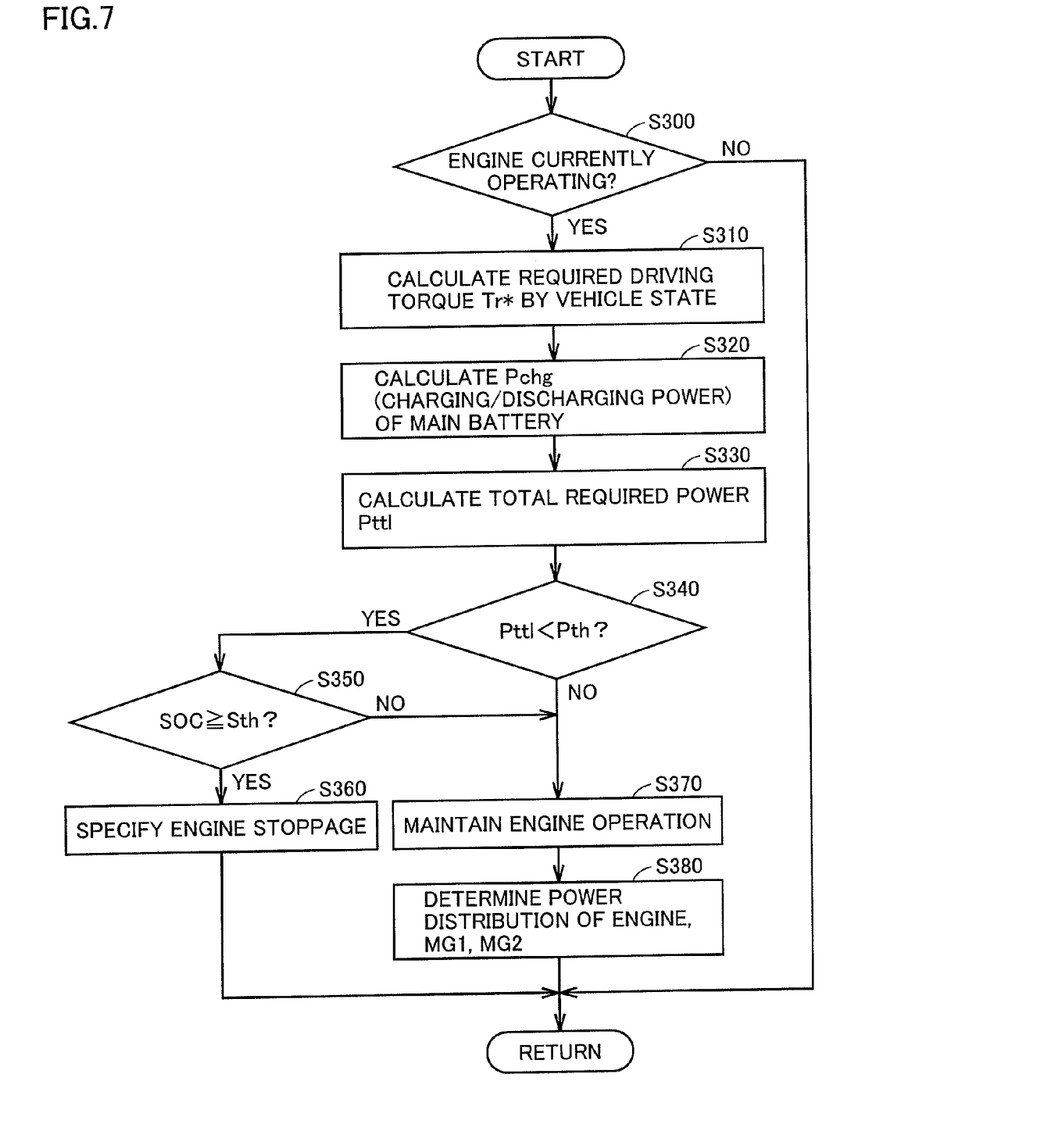
FIG. 7 is a flowchart to describe a control process in a second running mode by the running control of a hybrid vehicle according to a second embodiment.

FIG. 7 is a flowchart to describe the control process in a second running mode according to hybrid vehicle running control in the second embodiment of the present invention. The process at steps S300-S370 in FIG. 7 corresponds to the function of running control unit 450 in FIG. 2. The process at step S380 corresponds to the function of output control unit 460 in FIG. 2.

Referring to FIG. 7, ECU 400 determines whether the engine is currently operating at step S300. When the engine is currently inactive (NO determination at S300), the process of steps S310-S380 described hereinafter is not executed. As already described, when in the first running mode, the running mode is selected according to the flowchart shown in FIG. 3. When the second running mode is selected, the control process indicated in the flowchart of FIG. 7 is executed also in the first embodiment.

ECU 400 calculates required driving torque Tr* from the vehicle state at step S310. For example, required driving torque Tr* is calculated from the vehicle state based on the function of the vehicle speed and accelerator pedal position, likewise with step S110 (FIG. 3).

ECU 400 obtains charging required power Pchg of main battery 310 at step S320.

Figure 8:
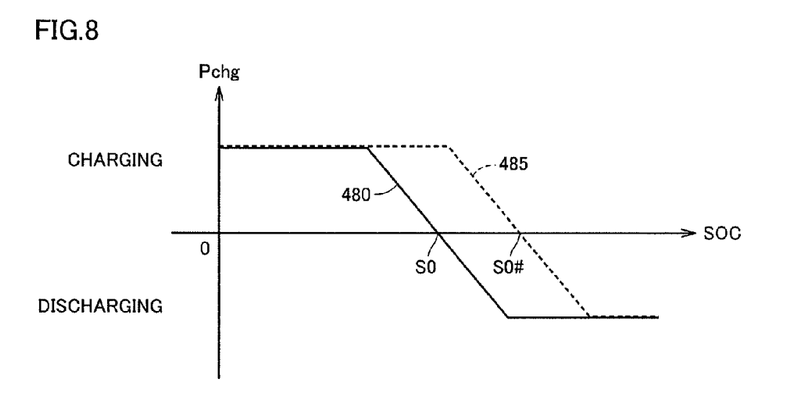
FIG. 8 is a diagram to schematically describe calculation of charging required power of a main battery.

As shown in FIG. 8, charging required power Pchg is basically set according to the SOC of main battery 310. In a normal state, charging required power Pchg is set such that the SOC is maintained within a predetermined range centered about a control target SO according to characteristic line 480.

Specifically, in the region where the SOC is lower than control target SO (SOC<SO), charging required power Pchg is set at a positive value (Pchg>0) to charge main battery 310. In contrast, in the region where the SOC is higher than the control target (SOC>SO), charging required power Pchg is set at a negative value (Pchg<0) to request discharging of main battery 310.

When the SOC matches the control target, neither charging nor discharging is requested in the charging/discharging control since Pchg=0. Although control target SO is set as a single SOC value in FIG. 8, a predetermined SOC range may be set as the control target.

Referring to FIG. 7 again, ECU 400 calculates total required power Pttl of the hybrid vehicle at step S330. For example, total required power Pttl is calculated according to equation (1) set forth below. In the second running mode, total required power Pttl is taken as output required power (Pe) of engine 100. In equation (1), Nr represents the revolution speed of output shaft 212, and Loss represent the loss term.

$$Pttl(Pe) = Tr^* \cdot Nr + Pchg + Loss \tag{1}$$

At step S340, ECU 400 compares total required power Pttl calculated at step S330 with power threshold value Pth, likewise with step S130. Power threshold value Pth at step S340 may be set to have hysteresis relative to power threshold value Pth at step S130.

When Pttl<Pth (YES determination at S340), ECU 400 compares the SOC of main battery 310 with determination value Stl at step S350, likewise with step S140. Determination value Stl can be set to differ between step S140 and step S350.

When Pttl≥Pth (NO determination at S340) or SOC<Sth (NO determination at S350), ECU 400 causes control to proceed to step S370 to run with the operation of engine 100 maintained. In other words, the second running mode is maintained.

In the second running mode, ECU 400 determines the power distribution between engine 100 and motor generators 300A (MG (1)), 300B (MG (2)) at step S380.

At this stage, ECU 400 determines the operating point of engine 100 (revolution speed×load) based on engine required power Pe according to total required power Pttl. For example, the crossing point between a operation line determined in advance as a group of operating points of high efficiency and equal power line corresponding to engine required power Pe is determined to be the engine operating point (target revolution speed Ne* and target torque Te*).

Further, the output torque of motor generator 300A is determined such that the engine revolution speed is restricted to target revolution speed Ne* by the output torque of motor generator 300A mechanically coupled with engine 100 by power split mechanism 200.

Then, ECU 400 calculates driving torque (direct torque) Tep mechanically transmitted to output shaft 212 when engine 100 is operated according to the engine operating point determined as set forth above. For example, direct torque Tep is set taking into consideration the gear ratio of power split mechanism 200.

Then, ECU 400 calculates the output torque of motor generator 300B so as to compensate for the insufficient amount (Tr*−Tep) of direct torque Tep relative to required driving torque Tr*. In other words, the following equation (2) is established where Tm2 is the output torque of motor generator 300B. Tm2* is the torque acting on output shaft 212 by the output from motor generator 300B.

$$Tr^* = Tep + Tm2^* \quad (2)$$

At step S380, the output required values (operation command value) to engine 100 and motor generators 300A, 300B are set based on the operating point of engine 100 and the output torque of motor generators 300A and 300B, determined as set forth above. Engine 100 and motor generators 300A, 300B are controlled according to such operation command values.

By the running control set forth above, the power distribution for the total required power between engine 100 and motor generators 300A, 300B can be determined such that required driving torque Tr* acts on the drive shaft while engine 100 is operated on the operation line of high efficiency. Moreover, the SOC of main battery 310 can be controlled within a predetermined range centered about the control target.

When Pttl<Pth (YES determination at 5340) and SOC≥Stl (YES determination at S350), ECU 400 causes control to proceed to step S360 to select a running mode with engine 100 stopped. In other words, modification from the second running mode to the first running mode is specified. Accordingly, output control unit 460 generates the MG required values for motor generators 300A and 300B and the output required value for engine 100 such that engine 100 is stopped and total required power Pttl is ensured by the output of motor generator 300B.

In the hybrid vehicle running control according to the second embodiment, the SOC control target in the second running mode is altered based on the operation pattern according to the intermittent operation of engine 100 during vehicle running (that is, intermittent startup data Dint).

Figure 9:
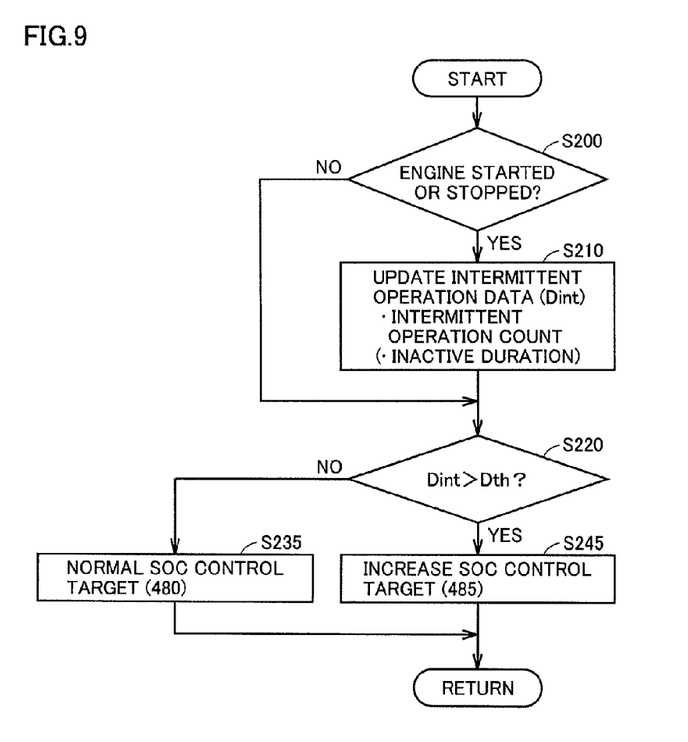
FIG. 9 is a flowchart to describe setting of a SOC control target based on an operation pattern by running control of the hybrid vehicle according to the second embodiment.

FIG. 9 is a flowchart to describe the setting of SOC control target based on the operation pattern by the hybrid vehicle running control according to the second embodiment. In FIG. 9, the process at steps S200 and S210 corresponds to the function of intermittent operation management unit 430 in FIG. 2, and the process at steps S220, S235 and S245 corresponds to the function of running control unit 450 in FIG. 2.

Referring to FIG. 9, ECU 400 generates intermittent startup data Dint, likewise with the first embodiment, at steps S200 and S210, similar to those in FIG. 5. Further, ECU 400 compares intermittent startup data Dint with threshold value Dth at step S220.

When Din≤Dth (NO determination at S220), ECU 400 causes control to proceed to step S235 where the normal SOC control target is set. Accordingly, in the second running mode, charging required power Pchg is set such that SOC is restricted to be within a predetermined range centered about SO according to characteristic line 480 shown in solid line in FIG. 8.

In contrast, when Dint>Dth (YES determination at S220), ECU 400 causes control to proceed to step S245 where the SOC control target is set higher than the normal value. Accordingly, charging required power Pchg is set according to a characteristic line 485 indicated by the dotted line that corresponds to characteristic line 480 shifted rightwards (to the larger SOC side) in FIG. 8. As a result, in the second running mode, charging required power Pchg is set such that the SOC is restricted to be within a predetermined range centered about SO#.

As appreciated from FIG. 9, in the case where intermittent startup data Dint is large, i.e. when in an operation pattern in which the stopping/starting of engine 100 (intermittent startup) occurs frequently, main battery SOC in the second running mode is controlled to be higher than the normal level. Accordingly, the startup of engine 100 directed to force charging of main battery 310 is suppressed after transition from the second running mode to the first running mode. Moreover, since power threshold value Pth can be suppressed from becoming lower by reducing discharging electric power upper limit Wout of main battery 310, startup of engine 100 in the first running mode will become harder to occur. As a result, vehicle running is controlled such that the number of times of intermittent startup of engine 100 may be suppressed.

Since running control is executed such that startup of engine to force charging during the first running mode is suppressed in the case of an operation pattern where the frequency of intermittent startup of engine 100 is high according to the hybrid vehicle running control of the second embodiment, the discomfort to the driver and degradation in the fuel efficiency caused by repeating stopping/startup of the engine frequently in a short period of time can be prevented.

The running of hybrid vehicle 10 can be controlled by combining the first and second embodiments such that both power threshold value Pth and the SOC control target are altered according to the operation pattern (intermittent startup data Dint) involved with the intermittent operation of engine 100 during vehicle running.

It is to be noted that the power train configuration of the hybrid vehicle to which the present invention is applied is not limited to the example shown in FIG. 1. In other words, running control of the present invention can be applied any hybrid vehicle having a running mode with the engine stopped and a running mode with the engine operating, i.e. having an engine operated intermittently during vehicle running, without restriction in the configuration of the power train such as the number of mounted motor generators and the configuration of the power generation mechanism. For example, the present invention can be applied to the so-called series type hybrid vehicle and parallel type hybrid vehicle.

It should be understood that the embodiments disclosed herein are illustrative and non-restrictive in every respect. The scope of the present invention is defined by the terms of the claims, rather than the description set forth above, and is intended to include any modification within the scope and meaning equivalent to the terms of the claims.

INDUSTRIAL APPLICABILITY

The present invention can be applied to running control of a hybrid vehicle running with intermittent operation of the engine.

REFERENCE SIGNS LIST

10 hybrid vehicle; 12 driving wheel; 14 reduction gear; 16 drive shaft; 100 engine; 200 power split mechanism; 212 output shaft; 270 solid line; 300A, 300B motor generator; 310 main battery; 320 boost converter; 330 inverter; 340 monitor unit; 400 ECU; 402 MG_ECU; 404 HV_ECU; 406 engine ECU; 410 SOC estimation unit; 420 charging/discharging limitation setting unit; 430 intermittent operation management unit; 450 running control unit; 460 output control unit; 470, 475 characteristic line (charging required power); 480, 495 characteristic line (power threshold value); Dint intermittent startup data; Dth threshold value (intermittent startup data); Ib battery current; MD flag (running mode); Pchg charging required power; Pe engine required power; Pth power threshold value; Pttl total required power; S0, S0# SOC control value; Stl determination value; Tb battery temperature; Tr* required driving torque; Vb battery voltage; Win charging electric power upper limit; Wout discharging electric power upper limit.

The invention claimed is:

1. A control device for a hybrid vehicle having an engine and a traction motor mounted, said control device comprising:
   a running control unit that selects a first running mode with said engine stopped and a second running mode with said engine operating, based on a state of the vehicle, and
   an engine control unit that starts said engine in association with modification from said first running mode to said second running mode, and stops said engine in association with modification from said second running mode to said first running mode,
   said running control unit controlling running of said hybrid vehicle such that modification from said first running mode to said second running mode is suppressed when frequency of intermittent startup is high as compared to a case where the frequency of said intermittent startup is low, based on a count of an amount of times that the engine is stopped within a predetermined period of time during vehicle running.

2. The control device for a hybrid vehicle according to claim 1, wherein said running control unit specifies modification to said second running mode when required power of said hybrid vehicle becomes higher than a threshold value in said first running mode, and
   said threshold value is set at a higher value when the frequency of said intermittent startup is high than when the frequency of said intermittent startup is low.

3. The control device for a hybrid vehicle according to claim 1, wherein said hybrid vehicle is further mounted with a power storage device to store electric power input to and output from said traction motor, and a power generation mechanism to generate charging electric power for said power storage device by an output from said engine,
   said running control unit starts said engine to charge said power storage device when SOC of said power storage device becomes lower than a predetermined value in said first running mode, and controls charging and discharging of said power storage device such that said SOC approximates a control target in said second running mode,
   said control target is set higher when the frequency of said intermittent startup is high than when the frequency of said intermittent startup is low.

4. The control device for a hybrid vehicle according to claim 1, wherein said running control unit determines, based on the count of the amount of times that the engine is stopped within the predetermined period of time and an inactive duration when said engine is stopped during said vehicle running, that the frequency of said intermittent startup is higher as the count of the amount of times that the engine is stopped is higher and the inactive duration is shorter.

5. A control method for a hybrid vehicle having an engine and a traction motor mounted,
   said hybrid vehicle configured to select a first running mode with said engine stopped and a second running mode with said engine operating based on a state of the vehicle,
   said control method comprising:
   monitoring an amount of times that the engine is stopped within a predetermined period of time during vehicle running according to stoppage and operation of said engine during vehicle running, and
   controlling running of said hybrid vehicle such that modification from said first running mode to said second running mode is suppressed when the frequency of said intermittent startup is high as compared to a case where the frequency of said intermittent startup is low, based on the amount of times that the engine is stopped within the predetermined period of time.

6. The control method for a hybrid vehicle according to claim 5, wherein said controlling step includes
   the step of specifying modification to said second running mode when required power of said hybrid vehicle becomes higher than a threshold value in said first running mode, and
   the step of setting said threshold value at a higher value when the frequency of said intermittent startup is high than when the frequency of said intermittent startup is low.

7. The control method for a hybrid vehicle according to claim 5, wherein said hybrid vehicle is further mounted with a power storage device to store electric power input to and output from said traction motor, and a power generation mechanism to generate charging electric power for said power storage device by an output from said engine,
   wherein said controlling step includes the step of starting said engine to charge said power storage device when SOC of said power storage device becomes lower than a predetermined value in said first running mode, the step of controlling charging and discharging of said power storage device such that said SOC approaches a control target in said second running mode, and the step of setting said control target at a higher value when the frequency of said intermittent startup is high than when the frequency of said intermittent startup is low.

8. The control method for a hybrid vehicle according to claim 5, wherein said monitoring step monitors the amount of times that the engine is stopped within the predetermined period of time and an inactive duration when said engine is stopped, in said controlling step, determination is made that the frequency of said intermittent startup is higher as said count of stopping said engine is higher and said inactive duration is shorter.

* * * * *